Oct. 24, 1933.  A. LIPPISCH  1,931,928
AIRCRAFT AEROFOIL
Filed Nov. 12, 1931
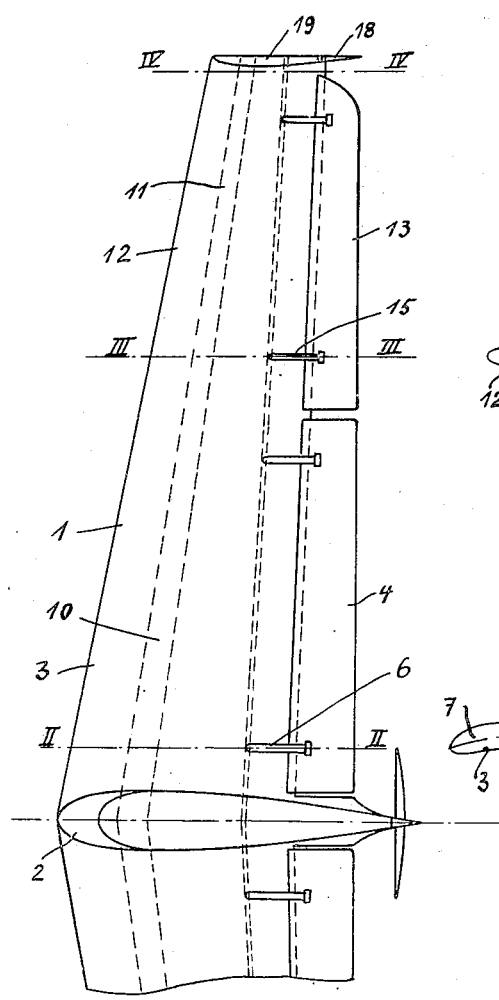
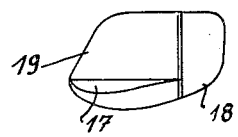
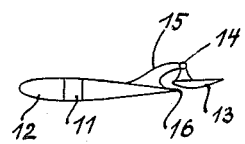
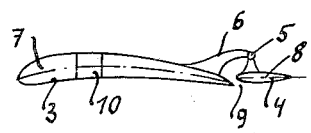
Inventor
Alexander Lippisch
By B. Singer, Atty.

Patented Oct. 24, 1933

1,931,928

UNITED STATES PATENT OFFICE 1,931,928

AIRCRAFT AEROFOIL

Alexander Lippisch, Fliegerlager-Wasserkuppe, Post Gersfeld, Germany, assignor of one-half to Deutscher Luftsportverband e. V., Berlin, Germany, a firm Application November 12, 1931, Serial No. 574,623, and in Germany December 13, 1929

11 Claims. (Cl. 244—12)

This invention relates to aircraft aerofoils particularly for arrow-shaped tail-less aircraft.

Aerofoils have already been proposed in which a section giving but slight deviation of the centre of pressure a single cross-beam is provided which is arranged within the limits of the deviation of the centre of pressure. Such aerofoils can be formed so as to be free from torsion for a normal position of flight, if the centre of gravity line of the cross-beam coincides with the centre of pressure line in this flying position. But for all other flying positions torsional stresses are produced upon the aerofoils.

The invention consists primarily in the feature that the aerofoil, for obtaining an invariable centre of pressure line, is formed in its main part with sections known per se having a double-cambered centre line and its total cross-beam structure is arranged with its axis of stress-resistance along this centre of pressure line.

Hereby the aerofoil and its cross-beam are free from torsion in all normal positions of flight, can conveniently be mathematically designed, and is particularly light, and the aerofoil is also specially suited for tail-less aircraft, as in the direction of flight it is not aerodynamically unstable and produces only slight stresses of the rudder surfaces arranged on the aerofoil together with small steering forces.

An advantageous constructional form is obtained for the aerofoil with the merging of a double-cambered section in a manner known per se into a symmetrical section this being effected by converting the double-cambered sections towards the aerofoil ends into symmetrical sections or also into inverted double-cambered stream line sections, in order to obtain sufficient thickness of the aerofoil at the small ends or also a downward-driving effect for the purpose of stabilization.

Further, vertical end discs in a known manner are with advantage arranged on the aerofoil ends for arrow-shaped and tail-less aircraft, and the end discs may be arched into a convex form towards the centre of the aircraft, in order to obtain with lateral squalls a good longitudinal stabilization in the sense of the possibility of luffing. The chords of the sections or the effective central lines of the sections of the end discs are directed with advantage parallel to the direction of flight, in order to ensure the smallest possible air-resistance with straight flight.

The end discs or parts of them can with advantage for trimming purposes be formed so as to turn either parallel with or opposite to one another, or they may be separately adjustable, in order to give, in addition to lateral steering action, also directional forces of different values for the automatic stabilization of the course of the aircraft.

For obtaining an invariable centre of pressure line over a wide range of starting angles a double-cambered or symmetrical aerofoil section is advantageously provided at the rear part with a continuous nozzle-like slot, or several slots, sloping from the front downwards towards the rear. Hereby, particularly for very small starting angles, thus for instance with descending flight, an interruption of the air flow at the underside of the back part of the aerofoil is effectively prevented, so that the aerofoil remains not only with a stationary centre of pressure but the aircraft also is well able to be controlled in these positions of flight.

With special advantage the slot running from the front downwards towards the rear is applied to the lifting planes or guide planes in front of the steering planes of the same, and preferably with such a disposition of the turning point of the steering plane within or above its section that the slot, even with the outward swinging of the steering planes, is not entirely closed in any position. The steering planes can then, without danger of interrupting the air flow, be inclined considerably upwards in order, for example, to quickly right the aircraft.

If, with an arrangement of this kind, the steering plane is formed for example, as a symmetrical section having a fixed pressure point, and rotatably suspended at the pressure point or thereover, then the steering plane is in equilibrium in all its swung out positions and is therefore easily handled even in the case of large constructions.

Finally, for very smooth air flow both the part of the aerofoil behind as well as the part located in front of the slot should be formed each as an independent stream-line section, for example in front a buoyancy-producing or symmetrically sectioned part and behind a down-driving or symmetrically sectioned part of the aerofoil.

The accompanying drawing illustrates the invention in a constructional example of an arrow-shaped aircraft steered by planes and tail-less with end discs, in which Fig. 1 is a top view;
Fig. 2 is a section on the line II—II;
Fig. 3 is a section on the line III—III;
Fig. 4 is a section on the line IV—IV.

Referring to the drawing, the central part of an arrow-shaped aerofoil 1 carries above its top side in the centre of the aircraft a short body or hull 2 which serves as the pilot's cockpit and in some cases for the accommodation of a motor.

According to section II—II (Fig. 2) the central part of the aerofoil consists on each side of the hull 2 of a front main aerofoil part 3 with an upwardly arched section and a rear part 4 serving as elevator and having a symmetrical section which is rotatably suspended, by means of several supporting arms 5 from the pressure point at about a quarter of the section-chord, on outriggers 6 of the main part 3 of the aerofoil. Between the parts 3 and 4 of the aerofoil a slot 9 is provided sloping from the front downwardly towards the rear and normally completely separating the parts 3 and 4, which slot owing to the suspension of the elevator plane 4 above its pressure point is not closed in any position of the said elevator plane 4. In straight flight the centre lines of the parts 3 and 4 of the aerofoil form a double-cambered line 7, 8 and thus the section forms a double-cambered aerofoil section 3, 4 with a continuous slot 9 arranged in the rear part sloping from the front downwardly towards the rear.

A cross-beam 10 formed as lattice-work or a frame is arranged at about a quarter of the depth of the total section of the aerofoil, that is, at the pressure point of the total section 3, 4, which cross-beam transmits the buoyancy forces of the aerofoil to the hull 2.

The cross-beam 10 tapers towards its outer part 11 and to this latter is connected an outer part 12 of the aerofoil with stream-line shaped symmetrical cross-section; the sectional forms of the two parts 3, 12 of the aerofoil are gradually merged one into the other. The rear edge of the outer part 12 of the aerofoil carries a transverse rudder plane 13 with stream-line shaped cross-section, which is suspended by means of supporting arms 14 on outriggers 15 of the part 12 of the aerofoil, similarly as with the parts 3, 4, 5, 6, so that between the parts 12, 13 of the aerofoil again a continuous nozzle-shaped slot 16 is formed sloping from the front downwardly towards the rear, and which is never closed in any position of the part 13 of the aerofoil.

The part 11 of the cross-beam here also has its centre of gravity in the centre of pressure line of the total profile 12, 13 of the aerofoil.

The transverse rudder section 13 is preferably arched downwardly convex, as illustrated, and thus forms together with the front section 12 to a certain extent a double-cambered section, which also provides at the small ends of the aerofoil a favorable thickness of the aerofoil. Towards the extreme ends of the aerofoil the part 12 can change into an inverted weak double-cambered section 17, in order at this point to obtain a downward drive effect favorable for the stability of the altitude.

Upon the end of the aerofoil is mounted an end disc 19 provided with a lateral rudder plane 18 connected thereto, which end disc stands perpendicular to the aerofoil and is arched convex towards the centre of the aircraft, while its exterior side is formed straight and directed parallel to the direction of flight. The exterior side of the end disc 19 can also be concave, and then its working section-chord is directed about parallel to the direction of flight. The end disc 19 together with the rudder plane 18 may also extend, as shown in Fig. 4, up to the lower side of the part 12 of the aerofoil.

The cross-beam 10, 11 remains free from torsion owing to its position along the centre of pressure line and to the invariability of this centre of pressure line in all usual positions of flight, and the slight torsional forces occurring with unusual positions of flight can easily be taken up by providing the aerofoil with a rigid nose of the usual kind, or by planking the entire aerofoil with sheet metal or ply-wood, so that the cross-beam structure has only to be calculated for bending and is extraordinarily light.

The described sections with fixed pressure points always remain with completely fixed pressure points, particularly in combination with the continuous nozzle-like slot in the rear part sloping from the front downwardly towards the rear for a very large range of starting angles corresponding to $c_a = -0,3$ up to $c_a = 1,2$. The slot provided between the rear parts 4, 13 of the aerofoil and the front parts 3, 12 of the same prevents, especially with descending flight, an interruption of the air flow on the underside of the rear part of the aerofoil, and therewith the entire aircraft from becoming unstable, so that this can always be again righted safely even with steep descending flight.

The elevator and transverse rudder planes 4, 13 are always in equilibrium and therefore easily handled owing to their suspension above their pressure point.

The end discs 19 arched convex towards the centre of the aircraft give a buoyancy force directed towards the centre of the aircraft owing to their section chord being directed parallel to the centre line of the aircraft with straight flight, and this buoyancy force with gusts striking the aircraft laterally or with side-slip of the aircraft is increased on the luff-side and is reduced on the lee-side in such a manner that the aircraft is automatically directed against the wind, thus is given a weather helm and therewith is stable in the direction of flight. For the strengthening of this course-stabilizing action the end discs 19 (or only the connected planes 18) may be made oppositely rotatable, in order to be able to direct the discs 19 or planes 19 after the manner of an arrow. Also the end discs 19 may be made rotatable in the parallel direction in order to trim the aircraft upon a straight flight.

I claim:

1. An aircraft aerofoil, particularly for arrow shaped tailless aircraft, comprising a main surface portion extending over the largest part of the entire span of the aerofoil from the aircraft middle plane and formed with streamlined sections each of which has a central line of double camber adapted to provide said section with an invariable center of pressure so as to obtain an invariable center of pressure line and a spar structure so arranged as to have its resultant axis of stress resistance along such pressure line, the free ends of the aerofoil being provided with vertical fins arched over their whole height.

2. An aircraft aerofoil, particularly for arrow shaped tailless aircraft, comprising a main surface portion extending over the largest part of the entire span of the aerofoil from the aircraft middle plane and formed with streamlined sections each of which has a central line of double camber adapted to provide said section with an invariable center of pressure so as to obtain an invariable center of pressure line and a spar structure so arranged as to have its resultant axis of stress resistance along such pressure line, the free ends of the aerofoil being provided with vertical fins arched over their whole height, the section chords of said fins or the chords of their effective section central lines being directed parallel to the direction of flight.

3. Aircraft aerofoil, as claimed in claim 1, wherein the double-cambered sections are transformed towards the free ends of the aerofoil into inverted double-cambered stream-line sections.

4. Aircraft aerofoil, as claimed in claim 1, wherein the fins carry lateral rudder planes and are adapted to swing in opposite directions to each other.

5. Aircraft aerofoil, as claimed in claim 1, wherein the fins carry lateral rudder planes and are adapted to swing in parallel directions.

6. Aircraft aerofoil, as claimed in claim 1, wherein a double-cambered or symmetrical aerofoil section has at the rear part a continuous slot sloping from the front downwardly towards the rear and being of such a shape that it subdivides the entire section into a forward portion producing an upward lift and a rear portion having a convex lower contour.

7. Aircraft aerofoil, as claimed in claim 1, wherein a double-cambered or symmetrical aerofoil section has at the rear part a continuous slot sloping from the front downwardly towards the rear, and the rear portion lying behind the slot sloping from the front downwardly towards the rear is formed as a rudder plane having a convex formed lower surface.

8. Aircraft aerofoil, as claimed in claim 1, wherein a double-cambered or symmetrical areofoil section has at the rear part a continuous slot sloping from the front downwardly towards the rear, the rear portion lying behind the slot sloping from the front downwardly towards the rear is formed as a rudder plane having a convex formed lower surface, and the portion formed as a rudder plane is supported within or above its section in such a manner that the slot is never entirely closed in any position.

9. Aircraft aerofoil, as claimed in claim 1, wherein a double-cambered or symmetrical aerofoil section has at the rear part a continuous slot sloping from the front downwardly towards the rear, the rear portion lying behind the slot sloping from the front downwardly towards the rear is formed as a rudder plane having a convex formed lower surface, and the portion formed as a rudder plane is rotatably suspended at the pressure point or at a point in the perpendicular erected at the pressure point above the rudder plane and is formed with a section, which may be symmetrical, stable in relation to the turning point.

10. Aircraft aerofoil, as claimed in claim 1, wherein a double-cambered or symmetrical aerofoil section has at the rear part a continuous slot sloping from the front downwardly towards the rear, and the slot is formed in nozzle-like rounded shape between portions of the aerofoil each of stream-line formation regarded separately of which the front one has a buoyancy-producing stream-line section and the rear one a downward-driving stream-line section.

11. Aircraft aerofoil, particularly for tailless aircraft, comprising an arrow shaped surface formed with streamline sections being double cambered over the largest part of the span of the aerofoil from the aircraft middle plane and being transformed towards the free ends of the aerofoil into substantially symmetrical streamline sections, each of said double cambered and symmetrical streamline sections having a form adapted to provide said section with an invariable center of pressure, so as to obtain an invariable line containing the centers of pressure of each section, in which pressure line being arrow shaped the resultant pressure force of the whole surface moves in lateral and forward direction, when the angle of incidence of the aerofoil is diminished and inversely, and a spar structure so arranged as to have its resultant axis of stress resistance along said arrow shaped pressure line.

ALEXANDER LIPPISCH.